United States Patent [19]

Norota et al.

[11] Patent Number: 4,526,735
[45] Date of Patent: Jul. 2, 1985

[54] PROCESS FOR PRODUCING FIBROUS ASSEMBLY

[75] Inventors: Susumu Norota, Ibaraki; Yasuhiko Segawa, Iwakuni; Tsutomu Kiriyama, Matsuyama; Shingo Emi, Daito; Tadasi Imoto; Tetsuo Yamauchi, both of Iwakuni, all of Japan

[73] Assignee: Teijin Limited, Osaka, Japan

[21] Appl. No.: 465,339

[22] Filed: Feb. 9, 1983

[30] Foreign Application Priority Data

Feb. 9, 1982 [JP] Japan .................................. 57-18167
Feb. 9, 1982 [JP] Japan .................................. 57-18168

[51] Int. Cl.$^3$ ............................................. B29F 3/08
[52] U.S. Cl. ................................... 264/27; 264/176 F;
264/DIG. 46; 425/174.6
[58] Field of Search ............... 264/176 F, 25–27,
264/DIG. 65, DIG. 46; 425/376 R, 174.6,
463–464

[56] References Cited

U.S. PATENT DOCUMENTS

| | | | |
|---|---|---|---|
| 2,063,663 | 12/1936 | Downard | 425/464 |
| 2,411,660 | 11/1946 | Manning | 264/176 F |
| 2,437,263 | 3/1948 | Manning | 264/176 F |
| 2,437,704 | 3/1948 | Moncrieff et al. | 425/376 R |
| 2,476,830 | 7/1949 | Spencer | 264/176 F |
| 2,657,427 | 11/1953 | Upton | 425/376 R |
| 2,888,711 | 6/1959 | Finlayson et al. | 264/25 |
| 2,932,851 | 4/1960 | Norman et al. | 425/464 |
| 2,955,320 | 10/1960 | Palmer et al. | 264/176 F |
| 4,399,084 | 8/1983 | Sagawa et al. | 264/176 F |

Primary Examiner—Jeffery Thurlow
Attorney, Agent, or Firm—Wenderoth, Lind & Ponack

[57] ABSTRACT

A process and apparatus for producing a fibrous assembly. At least one fiber-forming polymer is extruded through a spinneret having numerous small openings. The process uses a die equipped with a spinneret having numerous closely spaced small openings and an opening ratio ($\alpha$) of at least 30%. At least one fiber-forming polymer in the form of a shaped mass having a specified compression resistance is continuously stuffed into said die. Said shaped mass has a shape such that it measures more in one direction than in another. There is passed through the spinneret an electric current sufficient to give said fiber-forming polymer Joule heat required for cutting said polymer by partitioning members defining the numerous small openings of the spinneret. The cut fiber-forming polymer is taken up as fine streams.

The present invention provides ultrathick aromatic polyamide fibers having an average cross-sectional area of about 0.01 mm$^2$ to about 5 mm$^2$ and comprising at least one fiber-forming aromatic polyamide and an inorganic or metallic fine powder or a fibrous material.

16 Claims, 11 Drawing Figures

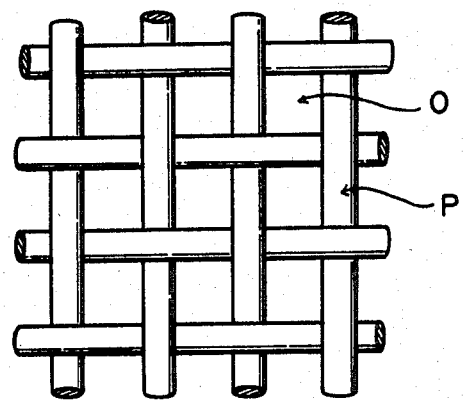
FIG. 1-a
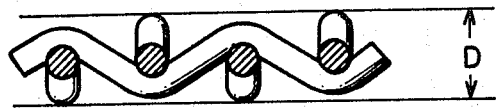
FIG. 1-b
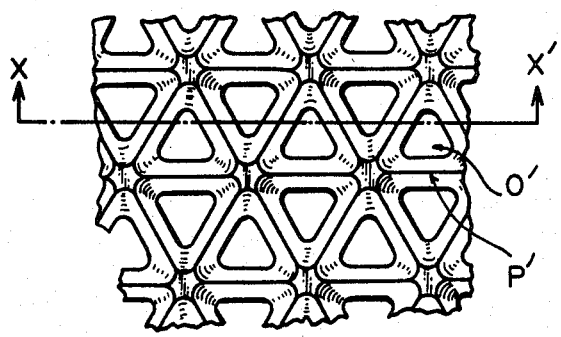
FIG. 2-a
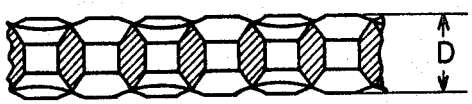
FIG. 2-b

PROCESS FOR PRODUCING FIBROUS ASSEMBLY This invention relates to a novel process for producing a fibrous assembly directly from a shaped mass of a fiber-forming polymer, and an apparatus therefor.

Melting forming, dry forming and wet forming are the three known methods for molding fiber-forming polymers into fibers. They operate on the same principle that polymer molecules are made easy to move (i.e., plasticized) temporarily. A melting method and a solution method are available as means of plasticizing. The former is used for melt forming and the latter, for dry forming and wet forming.

Needless to say, the melting method is industrially advantageous over the solution method in regard to any of cost, safety and the versatility of forming. However, polyacrylonitrile, polyvinyl chloride, polyvinyl alcohol, poly(m-phenylene isophthalamide), cellulose, etc. undergo decomposition by heat to a greater degree than they are plasticized, and are therefore, considered to be impossible of melt forming by conventional melt-forming methods. According to the present state of art, therefore, these polymers have to be fiberized by the dry or wet forming techniques utilizing the solution method by which such polymers are plasticized by suitable solvents.

Attempts have been known, on the other hand, to plasticize these polymers considered to be impossible of melt forming, by jointly using the melting method and a solution method in order to apply a method which is as closest as possible to a usual melt forming technique. One example is the plasticization of poly(m-phenylene isophthalamide) with a complex-forming solvent at high temperatures (see Japanese Laid-Open Patent Publication No. 98764/1977). However, even with such a means, a solvent must be used in no small amounts in order to avoid thermal decomposition of polymer, and after all, a device for extracting the solvent thermally or with phase equilibrium is required and the method is still not free from the defects of the solution method.

According to the conventional concept of melt forming, the "stability of the molten state" has been regarded as the first essential requirement for melt forming. Since several minutes to several tens of minutes is required for a solid polymer to be melted under heat and reach the spinneret in the conventional melt forming method, it is natural that stability should be of utmost importance in order to reduce the decomposability or crosslinkability of the polymer in the molten state. But the decomposition or crosslinking of the polymer under heat has closely to do not only with its temperature but also with the time during which the polymer remains molten. If this time is greatly shortened, the measure of the melt-formability of the polymer would be drastically changed.

From this viewpoint, the present inventors worked on a new forming process which would enable the melting time to be drastically shortened. As a result, the present inventors invented a process for instantaneously melt-forming a solid powdery polymer by a heated mesh spinneret (U.S. Ser. No. 293,269 filed Aug. 17, 1981 now U.S. Pat. No. 4,399,084 issued Aug. 16, 1983; European patent application No. 81303726.4 filed Aug. 14, 1981). The present inventors furthered their work in order to develop a process and an apparatus which would show an advance over the earlier invention.

It is an object of this invention therefore to provide a process for producing a fibrous assembly from a fiber-forming polymer very easily and efficiently, and a compact apparatus therefor.

Another object of this invention is to provide a process for easily and efficiently producing a fibrous assembly substantially under the action of heat alone without using a solvent from a fiber-forming polymer which has a decomposition point near its melting point and has therefore been considered previously to be difficult or impossible of melt forming, and a compact apparatus therefor.

Another object of this invention is to provide a process for producing a fibrous assembly easily and efficiently from various thermoplastic polymers which are known to be convertible to fibers by melt spinning, and a compact apparatus therefor.

Another object of this invention is to provide an industrially simple and advantageous process, and a compact apparatus, for producing fibers from a fiber-forming polymer which until reaching heated partitioning members of a spinneret, does not substantially have enough plasticity to enable it to be cut by the partitioning member, but when reaching the immediate vicinity of the partitioning members, is for the first time given enough plasticity to enable it to be cut by the heated partitioning members of the spinneret, and which, therefore, is heated in the vicinity of the spinneret for a very short period of time until it is sufficiently plasticized for cutting by the partitioning members, and thus converted to fibers efficiently.

Another object of this invention is to provide a process in which a fiber-forming polymer as a shaped mass is continuously stuffed into a die equipped with a spinneret, and before the shaped mass reaches the spinneret, it is substantially defoamed although it has no sufficient plasticity for cutting by the partitioning members, and therefore, it is converted to fibers industrially advantageously without troubles such as filament breakage.

Another object of this invention is to provide an industrially advantageous process which comprises feeding a fiber-forming polymer as a shaped mass smoothly into a die equipped with a spinneret having numerous small openings, whereby fibers of the polymer are taken up smoothly as fine streams from these small openings.

Another object of this invention is to provide a spinning process in which a fiber-forming polymer composition such as a composition comprising a fiber-forming polymer and another fiber-forming polymer, or a composition comprising a fibre-forming polymer and an additive does not undergo any great change in texture while being cut by partitioning members, so that the texture of such a fiber-forming polymer composition before reaching a spinneret is reflected on the composition and mixed state of the finally obtained fibrous assembly.

Another object of this invention is to provide ultra-thick fibers of an aromatic polyamide having a cross-sectional area of 0.01 $mm^2$ at the smallest and containing an inorganic or metallic fine powder or a fibrous material, which aromatic polyamide has previously been considered to be difficult or impossible of melt forming because of its decomposition point close to its melting point, and known to give only fine fibers having a size of about 10 denier (corresponding to a cross-sectional area of about 0.0008 $mm^2$) at the largest by a solution molding technique.

Another object of this invention is to provide a brush composed of the aforesaid ultrathick fibers of aromatic polyamide which have an excellent brushing effect and is suitable, for example, for use in removing materials adhering to a metal surface kept at high temperatures.

Still other objects and advantages of this invention will become apparent from the following description.

These objects and advantages of this invention are firstly achieved in accordance with this invention by a process for producing a fibrous assembly by extruding at least one fiber-forming polymer through a spinneret having numerous small openings, said process being characterized by using a die equipped with a spinneret having numerous closely spaced small openings having an opening ratio ($\alpha$), defined by the following equation, of at least 30%, $$\alpha = \frac{V_a - V_f}{V_a} \times 100 \, (\%)$$

wherein $V_a$ (cm$^3$) is the total apparent volume of the spinneret which is taken within 1 cm$^2$ of the porous portion of the spinneret and $V_f$ (cm$^3$) is the total volume of partitioning members defining the small openings which is taken within 1 cm$^2$ of the porous portion of the spinneret;

continuously stuffing at least one fiber-forming polymer in the form of a shaped mass into said die, said shaped mass having compression resistance such that at least in the initial stage of its stuffing into the die it substantially retains its form in resistance to the stuffing pressure, and said shaped mass having such a shape that it measures more in one direction than in another; passing through the spinneret an electric current sufficient to give said fiber-forming polymer Joule heat required for cutting said polymer by partitioning members defining the numerous small openings of the spinneret; and taking up the cut fiber-forming polymer as fine streams.

According to this invention, the process of this invention can be conveniently practiced by using a forming apparatus for the production of a fibrous assembly, said forming apparatus comprising a spinneret composed of a conductor capable of generating Joule heat upon passing an electric current therethrough and having numerous closely spaced small openings with an opening ratio ($\alpha$), defined hereinabove, of at least 30%; a die equipped with said spinneret and a passage leading to said spinneret for passing a shaped mass of said fiber-forming polymer to feed it to said spinneret; means for continuously stuffing said shaped mass into the passage of said die; and means for taking up the fiber-forming polymer cut as fine streams by partitioning members defining the numerous small openings of the spinneret.

The present invention is described below in detail with reference to the accompanying drawings in which:

FIG. 1-*a* is a top plan view of a plain-weave wire mesh as one example of the spinneret used in this invention;

FIG. 1-*b* is a sectional view of the spinneret shown in FIG. 1-*a*;

FIG. 2-*a* is a partly enlarged, top plan view of another example of the spinneret used in this invention which is obtained by the etching of a metal plate;

FIG. 2-*b* is a sectional view of a part of the spinneret shown in FIG. 2-*a*;

Figure 5:
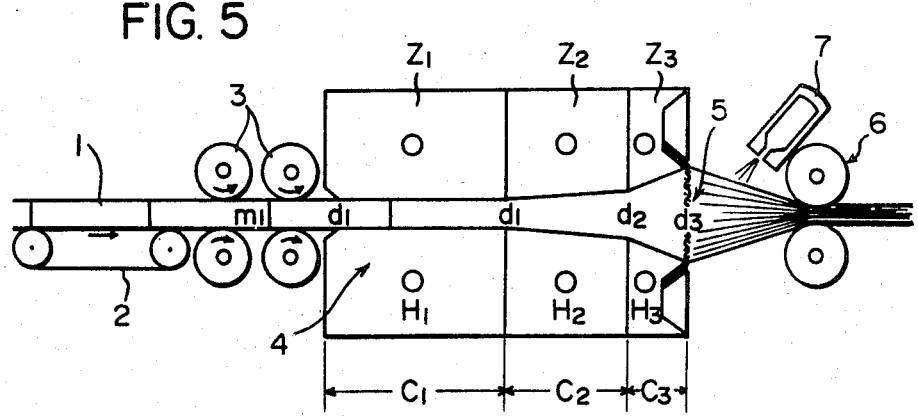
FIG. 5 is a rough explanatory view, partly in section, showing one embodiment of the apparatus for practicing the process of this invention.
Figure 8:
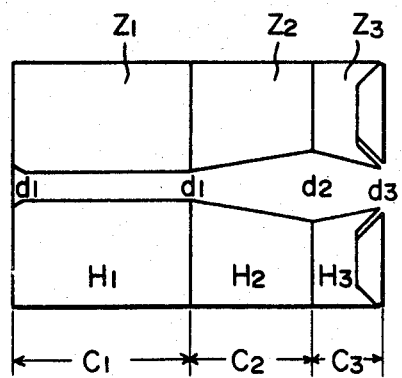
Figure 9:
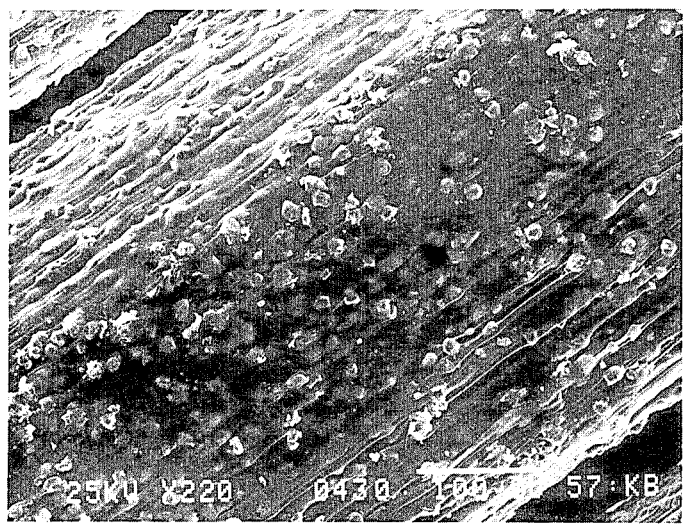

FIG. 8 is a sectional view of a die in the apparatus of this invention, in which the passage for the shaped mass is composed of three zones $C_1$, $C_2$ and $C_3$, showing a different example from that shown in FIG. 5; and FIG. 9 is a scanning electron microphotograph of the surface of poly(m-phenylene isophthalamide) fibers containing an alumina powder which were obtained in Example 3 of this application.

The spinneret used in this invention has numerous closely spaced small openings. The presence of the numerous small openings is represented by the fact that the opening ratio ($\alpha$) defined by the following equation, which is the ratio of the total area of all the small openings based on the spinning surface of the spinneret, is at least 30%.

$$\alpha = \frac{V_a - V_f}{V_a} \times 100 \, (\%)$$

wherein $V_a$ (cm$^3$) is the total apparent volume of the spinneret which is taken with in 1 cm$^2$ of the porous portion of the spinneret and $V_f$ (cm$^3$) is the total volume of partitioning members defining the small openings which is taken within 1 cm$^2$ of the porous portion of the spinneret.

There is no limitation imposed on the shape of the small openings or the shape of the partitioning members defining the small openings in the spinneret used in this invention. The shape of the small openings may, for example, be circular, elliptical, triangular, or polygonal (e.g., tetragonal, hexagonal), and the partitioning members may have raised or depressed portions. Preferably, the spinneret used in this invention has small openings which are circular, triangular, tetragonal or hexagonal in shape. The partitioning members may be in the shape of fine filaments, or a thin plate whose surface having the largest area faces the fiber-forming polymer being passed through the small openings.

FIG. 1-*a* of the accompanying drawings illustrates one typical example of the spinneret having numerous small openings used in this invention. The illustrated spinneret is a plain-weave wire mesh. FIG. 1-*b* shows a sectional view of the wire mesh shown in FIG. 1-*a*. In the plain-weave wire mesh shown in the drawings, each small opening O is tetragonal, and each partitioning member P is made of a fine filament. It will be seen from FIG. 1-*b* that the plain-weave wire mesh has a depressed portion in a partitioning member between adjacent small openings.

FIG. 2-*a* of the accompanying drawings illustrates another example of the spinneret used in this invention. The illustrated spinneret is an etched porous plate obtained by providing numerous small openings on a thin metal plate by a precise etching technique. In the etched porous plate, each small opening O' is triangular, and it will be seen from FIG. 2-*b* showing the section of the etched porous plate shown in FIG. 2-*a* that a partitioning member P" existing between adjacent small openings does not have a depressed portion. This type of spinneret makes it easy to plasticize and divide the polymer because each partitioning member has a knife edge.

Figure 3:
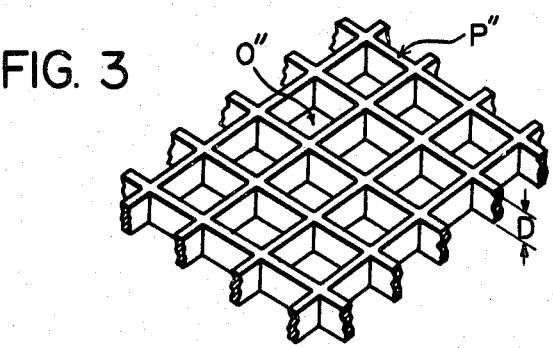
FIG. 3 is a partly enlarged perspective view of a lattice-type spinneret as still another example of the spinneret used in this invention.

FIG. 3 of the accompanying drawings illustrates still another example of the spinneret used in this invention. In the illustrated spinneret, each small opening O" is tetragonal, and each partitioning member P" is a thin-plate whose surface with the largest area faces the fiber-forming polymer being passed through the small openings. This type of spinneret can have a high strength even when it has a high opening ratio.

The spinneret used in this invention may also be a twill-weave wire mesh.

Some of the spinnerets used in this invention are disclosed as a mesh spinneret in the specification of U.S. patent application Ser. No. 133,288 now U.S. Pat. No. 4,355,075 issued Oct. 19, 1982.

With regard to the above equation defining the opening ratio ($\alpha$) of the spinneret, the porous portion of the spinneret means that portion of the spinneret which has numerous closely spaced small openings.

In the equation defining the opening ratio ($\alpha$), $V_a$ is the total apparent volume which the porous portion of the spinneret occupies within a unit area (1 cm$^2$), and $V_f$ is the total volume which the partitioning members defining the small openings occupy within a unit area (1 cm$^2$).

It will be seen from FIGS. 1-*a* and 1-*b* that when two phantom surfaces having a unit surface area and being in contact with the surface and back of the spinneret respectively are considered, the total apparent volume ($V_a$) is defined as the volume of that portion of the spinneret which is interposed between these two phantom surfaces having the unit surface area. If the unit area is taken as 1 cm$^2$, $V_a$ equals D which is the thickness of the spinneret.

In FIG. 2 also, the volume ($V_a$) of that portion of the spinneret which is interposed between two phantom surfaces having an area of 1 cm$^2$ equals D. In practice, therefore, the $V_a$ value of a certain spinneret can be determined simply by measuring the thickness of the spinneret by means of a dial gauge having a contact surface with an area of 1 cm$^2$.

In determining the $V_f$ value of a certain spinneret, it is cut to a predetermined area, and submerged in a liquid such as water. The resulting increase in volume is measured. $V_f$ is obtained by converting the increased volume for each square centimeter of the spinneret.

Since the opening ratio ($\alpha$) is expressed by the following formula $$\alpha = \frac{V_a - V_f}{V_a} \times 100 \ (\%)$$

it will be understood that if a 1 cm$^2$ area of the spinneret is used as a standard in determining $V_a$ and $V_f$, the value showing $V_a$ represents the thickness (D) of the spinneret as illustrated in FIGS. 1-*b* and 2-*b*.

Preferably, the spinneret used in this invention has an opening ratio ($\alpha$) of about 40 to about 95%.

If the opening ratio $\alpha$ of the spinneret is too low (less than 30%), the fiber-forming polymer undergoes an increased resistance when instantaneously plasticized and divided by partitioning members defining the numerous small openings of the spinneret, and moreover, the time during which the polymer is in contact with the heated partitioning members increases. Hence, if the polymer is susceptible to thermal decomposition, it is difficult to mold. There is no critical upper limit to the opening ratio $\alpha$, but desirably, it is up to 95% in order to retain the strength of the spinneret and to prevent melt-adhesion of the polymer after plasticizing and dividing.

The spinneret used in this invention has preferably at least one, more preferably about 5 to about 1000, especially preferably about 10 to about 500, small openings per cm$^2$ of the molding zone of the spinneret.

When conventional stainless steel wire meshes are used as the spinneret in accordance with this invention, they preferably have a size of 5 to 80 mesh, more preferably 8 to 60 mesh.

The forming zone of the spinneret in accordance with this invention has a thickness of not more than about 10 mm, preferably about 0.1 mm to about 5 mm, more preferably about 0.2 mm to about 2 mm.

The spinneret in accordance with this invention must be made of a conductor in order to pass an electric current through it and thus generate Joule heat. For example, it may be made of a metallic element such as platinum, copper, titanium, tungsten, iron, nickel or chromium, or an alloy such as stainless steel, Nichrome or brass. Stainless steel and Nichrome are preferred because these materials have a moderate resistance (10 to 100 microohms-cm) for easy generation of Joule heat required in this invention, a high melting point (more than 1000° C.), a low coefficient of thermal expansion, a high strength and good processability.

Usually, a current of 0.1 to several hundred amperes is directly passed through the spinneret. Thus, preferably an energy in an amount of about 0.5 to about 5,000 watts per cm$^2$ of the spinneret is imparted.

The process of this invention is practiced by continuously stuffing at least one fiber-forming polymer in the form of a shaped mass into a die equipped with a spinneret having numerous small openings as defined by the opening ratio of at least 30% while passing an electric current through partitioning members of the spinneret, and cutting the polymer with the partitioning members.

The process of this invention is applicable not only to polymers which have previously been known to be spun into fibers by melt spinning but also to polymers which have previously been considered to be difficult or impossible of melt spinning because of a decomposition point being close to the melting point or of a very high degree of polymerization. Specifically, according to the process of this invention, a fibrous assembly can be produced not only from polymers which can be formed into fibers by conventional melt-spinning techniques, but also from polymers previously considered to be difficult or impossible of melt spinning because of a thermal decomposition point being close to the melting point as in poly(m-phenylene terephthalamide) or of an ultrahigh viscosity as in polyethylene having a molecular weight of more than one million or wholly aromatic polyesters having an intrinsic viscosity of at least 4 and showing melt anisotropy.

Even a polymer which has a much lower thermal decomposition point than its melting point and is considered to be difficult to melt instantaneously, such as poly(vinyl chloride), can be molded by the process of this invention into a fibrous assembly in the presence of, for example, several percent of a plasticizer because only the required part of the polymer can be instantaneously heated, plasticized and divided by the heated partitioning members of the spinneret.

Specific examples of fiber-forming polymers which can be used in this invention are given in (i) to (iv) below.

(i) Olefin-type or vinyl-type polymers

Polyethylene, polypropylene, polybutylene, polystyrene, polyvinyl chloride, polyvinyl acetate, polyacrylonitrile, polyacrylates, and copolymers of the monomers constituting these polymers with each other.

(ii) Polyamides

Aliphatic polyamides such as poly(epsiloncaprolactam), poly(hexamethylene adipamide) and poly(hexamethylene sebacamide), and aromatic polyamides.

Preferred aromatic polyamides contain at least 50 mole%, preferably at least 70 mole%, of at least one recurring unit selected from the group consisting of recurring units derived from an aromatic dicarboxylic acid, recurring units derived from an aromatic diamine and recurring units derived from an aromatic aminocarboxylic acid. Especially preferred aromatic polyamides consist essentially of units derived from an aromatic dicarboxylic acid and units derived from an aromatic diamine.

Preferably, the units derived from an aromatic diacarboxylic acid are represented by the following formula

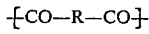

wherein R represents a divalent aromatic radical;
the units derived from an aromatic diamine are represented by the following formula

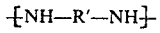

wherein R' represents a divalent aromatic radical;
and the units derived from an aromatic aminocarboxylic acid are represented by the following formula

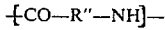

wherein R" represents a divalent aromatic radical.

The aforesaid units derived from aromatic dicarboxylic acids, aromatic diamines and aromatic aminocarboxylic acids are present so that the proportions of the carbonyl group (—CO—) and the amino group (—NH—) are nearly equal.

Illustrative of the divalent aromatic radical in the above formulae are p-phenylene, m-phenylene, 1,5-naphthylene, 2,6-naphthylene, 3,3'-, 4,4'- or 3,4'-diphenylene, 3,3'-, 4,4'- and 3,4'-diphenylether radicals.

In addition to the aforesaid units derived from aromatic dicarboxylic acids, aromatic diamines and aromatic aminocarboxylic acids, the aromatic polyamides which can be used in this invention may contain units represented by the above formulae in which the definitions of R, R' and R" are changed to divalent aliphatic radicals, for example radicals used in the field of aliphatic polyamides, such as tetramethylene, pentamethylene and hexamethylene radicals.

Specific examples of such aromatic polyamides include poly(p-phenylene isophthalamide), poly(m-phenylene isophthalamide), poly(m-phenylene terephthalamide), poly(1,5-naphthylene isophthalamide), poly(3,4'-diphenylene terephthalamide), and copolymers of these. Among these, poly(m-phenylene isophthalamide) is especially preferred.

(iii) Polyesters

Polyesters or wholly aromatic polyesters derived from a dibasic acid component which is, for example, an aromatic dicarboxylic acid such as phthalic acid, isophthalic acid, terephthalic acid, diphenyldicarboxylic acid or naphthalene-dicarboxylic acid, an aliphatic dicarboxylic acid such as adipic acid, sebacic acid or decanedicarboxylic acid or an alicyclic dicarboxylic acid such as hexahydroterephthalic acid, and a glycol component which is, for example, an aliphatic glycol such as ethylene glycol, propylene glycol, trimethylene glycol, tetramethylene glycol, decamethylene glycol, diethylene glycol of 2,2-dimethylpropanediol, an alicyclic glycol such as hexahydroxylylene glycol, an aromatic-aliphatic glycol such as xylene glycol, or an aromatic dihydroxy compound such as resorcinol or hydroquinone. These polyesters or wholly aromatic polyesters may contain a hydroxycarboxylic acid component such as p-hydroxybenzoic acid. The polyesters or wholly aromatic polyesters contain at least one of the aforesaid dibasic acid components and at least one of the aforesaid glycol components.

Especially preferred polyesters include polyethylene terephthalate, polytetramethylene terephthalate, polytrimethylene terephthalate, the polyester elastomers described in U.S. Pat. Nos. 3,763,109, 3,023,192, 3,651,014 and 3,766,146, and the wholly aromatic polyesters described in U.S. Pat. Nos. 3,036,990, 3,036,991, and 3,637,595.

(iv) Other polymers

Polycarbonates derived from various bisphenols, polyacetal, various polyurethans, polyfluoroethylene polymers, polytrifluorochloroethylene, polyvinylidene difluoride, tetrafluoroethylene/hexafluoropropylene copolymer, tetrafluoroethylene/perfluoroalkyl vinyl ether copolymer, tetrafluoroethylene/ethylene copolymer, tetrafluoroethylene, propylene copolymer, polyvinyl fluoride, and trifluorochloroethylene/ethylene copolymer.

According to the process of this invention, the fiber-forming polymer is used in the form of a shaped mass. The shape of the shaped mass is such that it has a much larger dimension in one direction than in another. For example, it may be in the form of a flat plate, a rod or a film laminate. Such a shaped mass can be produced, for example, by compression-forming a powder of the polymer, or by melt-forming the polymer. When the polymer is a polymer having a melting point close to its decomposition point, such as an aromatic polyamide, it is formed by the compression-forming method. On the other hand, from a melt-formable polymer, a shaped mass may be produced either by the compression-forming technique or the melt-forming technique.

Figure 4:
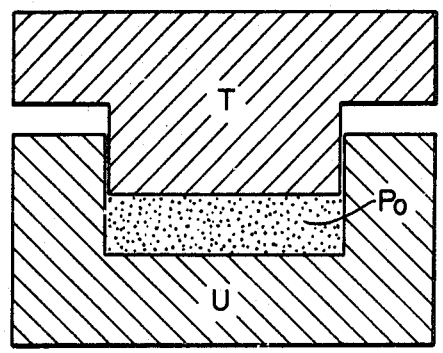
FIG. 4 is a simplified sectional view showing a compression-forming apparatus for producing the shaped mass used in this invention from a powder of a fiber-forming polymer.

The compression forming can be carried out, for example, by using a mold having the cross-sectional shape shown in FIG. 4. A predetermined amount of the fiber-forming polymer $P_o$ (preferably in powder form) is put in a female mold U, and then compressed by a male mold T to give a shaped mass having the desired compression strength. When the mold shown in FIG. 4 is used, the resulting shaped mass has an elongaged rectangular cross-sectional shape. The compression pressure varies depending upon the shape and size of the polymer or the desired compression strength. Usually, it may be at least 1 kg/cm², preferably 1 to 100 kg/cm². Heating the polymer during compression may be preferred because a shaped mass having the desired compression strength can easily be obtained frequently under lower compression pressures. Such heating can be done by heating the mold by methods known per se.

According to the aforesaid compression-molding method, at least two different fiber-forming polymers in powder form may be mixed and molded. Or a powdery mixture of at least one fiber-forming polymer and an additive may be molded into a shaped mass. The additive may be any material which can give some function to the fibers, for example light stabilizers, pigments, heat stabilizers, fire retardants, lubricants, inorganic or metallic fine powders such as abrasive grains, or fibrous materials. These additives need not to be meltable at the temperature of the spinneret used in this invention if only they have such a size as to be able to pass through the small openings of the spinneret.

The inorganic or metallic fine powder or the fibrous materials will be further described hereinafter with regard to ultrathick aromatic polyamide fibers containing them.

According to the process of this invention in which the fiber-forming polymer is used in the form of a shaped mass, a large amount of an additive can be easily mixed uniformly with the polymer. As a result of mixing a large amount of the additive, there can be obtained fibers containing a large amount of the additive which cannot be obtained by a conventional method. For example, according to the process of this invention, a hard granular material such as abrasive grains can be mixed in a high mixing ratio without a mixing trouble, and fibers can be obtained in which the mixed state of the shaped mass is directly reflected.

Melt-molding is applied, for example, to a polymer produced by melt-polycondensation, such as polyethylene terephthalate. By directly extrusion-molding the polymer after the end of the polycondensation, it can be formed into a shaped mass suitable for use in this invention.

The shaped mass used in the process of this invention should not easily be disintegrated when it is compressed. This property means that as will be stated hereinafter, the shaped mass should have such a compression resistance that at least in the initial stage of the shaped mass being stuffed into a die of the molding apparatus for the production of a fibrous assembly, it substantially retains its form against the stuffing pressure.

Preferably, the shaped mass is fed to the die after it has been formed into a shaped mass having a cross-sectional shape nearly corresponding to the cross-sectional shape of the passage of the die. For example, when the passage of the die has an elongated rectangular cross-sectional shape, the shaped mass is preferably in a flat plate having a cross-sectional shape nearly corresponding to the elongated rectangular shape. The thickness of such a flat plate corresponds to the length of each of the shorter sides of the elongated rectangular cross-sectional shape of the passage of the die. It will be easily understood therefore that the flat plate may be in the form of a single plate or a plurality of stacked plates. Likewise, it will be understood that films are fed as a laminate into the passage of the die, and the rod-like mass is fed into the passage of the die in the form of an assembly of rods having the shape which permits feeding into the passage of the die and being aligned with their longitudinal directions parallel to the direction of the passage of the die.

The important point of the shaped mass used in the process of this invention is that it has such compression resistance that it substantially retains its form against the stuffing pressure at least in the initial stage of its being stuffed into the die. A shaped mass which is immediately disintegrated when stuffed into the die, or a mere powdery mixture having no definite shape cannot be used in the process of this invention. When the polymer is fed in the form of a mere powdery mixture into the die, the stuffing pressure is dispersed within the passage and even a part of the stuffing pressure frequently does not reach the spinneret surface. Very high stuffing pressures are required to prevent it, and even when such very high stuffing pressures are employed, the feeding of the powder is not effected smoothly and troubles such as filament breakage occur. Since in the process of this invention, a spinneret having numerous small openings as shown by its opening ratio of at least 30% is used, the polymer can be cut into fine streams by the partitioning members defining the small openings without the need to impart so high an extruding pressure to the spinneret unlike the case of using a conventional spinneret having a very low opening ratio. According to the process of this invention, therefore, the polymer can be converted to fibers by simply stuffing its shaped mass continuously into the die. As can be understood from the foregoing statement, it is necessary that the shaped mass should have compression resistance such that it substantially retains its shape at least in the initial stage of stuffing into the die, and enable the stuffing pressure to be propagated smoothly in the stuffing direction.

Preferably, the compression-formed mass used in this invention has an apparent density 0.3 to 0.95 times its true density, i.e. the average true density of the materials constituting the shaped mass.

The average true density $\rho$ is defined by the following equation.

$$\bar{\rho} = \sum_{i=1}^{n} x_i \rho_i$$

wherein $x_i$ is the weight fraction of a certain substance, which is defined by the following formula when the weight of the substance is represented by $w_i$ $$x_i = \frac{w_i}{\sum\limits_{i=1}^{n} w_i}$$

and $\rho_i$ is the true density of the substance.

The compression-formed mass used in this invention preferably has a packing ratio $\epsilon$, defined by the following equation, of 30 to 95%.

$$\epsilon = \frac{\sum\limits_{i=1}^{n} V_i}{V_a} \times 100 = \frac{\sum\limits_{i=1}^{n} \frac{w_i}{\rho_i}}{V_a} \times 100 \ (\%)$$

wherein $V_a$ is the apparent volume of the shaped mass, $V_i$ is the true volume of a certain substance constituting the shape mass, $w_i$ is the weight of this substance, and $p_i$ is the true density of the substance.

Especially preferably, the compression-formed mass used in this invention has an apparent density at least 0.5 times its its true density, and in other words has a packing ratio of at least 50%.

The process of this invention is carried out by stuffing a shaped mass of the fiber-forming polymer into the passage of the die, leading the components (to be referred to simply as "polymer" hereinafter) of the shaped mass to a spinneret provided at the other end of the passage, passing through partitioning members defining the small openings of the spinneret an electric current sufficient to give Joule heat required for cutting the polymer, and thereafter taking up the cut polymer as fine streams.

The present invention is described in greater detail with reference to FIG. 5.

Shaped masses 1 in the shape of a flat plate are aligned in series on a conveyor belt 2, and fed by means of two sets of a pair of rollers 3 constituting stuffing means. The surfaces of the pair of rollers 3 are made of soft rubber, and the rollers stuff the plate-like shaped masses successively into a die 4 while holding them firmly. In the example shown in FIG. 5, the stuffing means consists of two sets of a pair of rollers. The number of rollers may be properly determined by the required stuffing force. Alternatively, the stuffing means may consist of at least one set of a pair of roller as shown in FIG. 5 and at least one set of a pair of belts capable of holding the shaped mass at their surface and back.

Because the aforesaid stuffing means are employed, the shaped mass used in this invention must have such pressure resistance that it withstands the holding pressure of the pair of rollers or the pair of belts, and at least in the initial stage of its being stuffed into the die, it substantially retains its form against the stuffing pressure. It is necessary therefore that the shape of that section of the shaped mass which is taken vertically of the stuffing direction should nearly correspond with that of the cross section of the inlet of the die passage, and the area of the former should be equal to, or less than, that of the latter.

As shown in FIG. 5, the passage of the die into which the shaped mass is stuffed is substantially linear from the inlet to the spinneret 5 provided at the end of the die.

Preferably, that section of the passage of the die which is taken at right angles to the passing direction of the shaped mass is of an elongated rectangular shape. The passage may have substantially the same shape and size all the way from its inlet for receiving the shaped mass (i.e., its inlet) to the spinneret. Or the passage may monotonously be broadened gradually, or first broadened and then narrowed, from its one end or from a point on its way to the other end in the direction of the spinneret.

In FIG. 5, the passage is comprised of three zones $C_1$, $C_2$ and $C_3$ defined by blocks $Z_1$, $Z_2$ and $Z_3$ respectively. In the zone $C_1$, the passage has substantially the same shape throughout, and in the zone $C_2$, the passage is broadened gently and gradually. In the zone $C_3$, the passage is broadened to a greater extent than in the zone $C_2$. The passage shown in FIG. 5 is gradually broadened from the inlet for the shaped mass toward the spinneret. Preferably, the die used in this invention is equipped with heaters for pre-heating the polymer passing through the passage. In FIG. 5, the heaters are indicated by $H_1$, $H_2$ and $H_3$.

One advantage of preheating the polymer in the passage of the die is that the heat energy to be supplied from the heated partitioning members defining the numerous small openings of the spinneret 5 is reduced and cutting of the polymer is made smooth when the polymer is plasticized and cut by the partitioning members. For example, when it is necessary to heat the polymer to 300° C. in order to plasticize and cut it (even when the polymer begins to undergo heat decomposition at a lower temperature than 300° C., for example at 200° C.), it is more desirable to preheat it to a temperature at which it does not begin to undergo heat decomposition, for example to 180° C. and then supply the remainder of the heat required for cutting from the partitioning members than to cause only the partitioning members to give the polymer all the heat required for heating it to 300° C.

Another important advantage of preheating the polymer in the passage of the die is that pores can be easily removed from a shaped mass having a packing ratio of less than 100%, namely a shaped mass having pores, while the shaped mass is passing through the passage. Investigations of the present inventors have shown that by heating a shaped mass having pores with the partitioning members of the spinneret without preheating, the polymer can be completely melted and the cut fine streams of the shaped mass can be taken up continuously if it is done slowly, but that when the rate of take up is increased at this time, there can only be obtained bubble-containing fine streams. It has been ascertained on the other hand that when the polymer passing through the passage of the die is preheated, preferably to a temperature near the softening point of the polymer by increasing the temperature of the polymer gradually from the inlet of the passage toward the spinneret, the packing ratio of the polymer within the passage gradually increases from the inlet of the passage toward the spinneret, and the polymer becomes substantially free from pores (its packing ratio reaches almost 100%) before the polymer reaches the spinneret and bubble-free fine streams can be taken up smoothly. As will be clear from the above statement, gases contained in the shaped mass escape not in the stuffing direction of the shaped mass within the die passage, but in an opposite direction, i.e. toward the inlet of the passage. This discharging of gases proceeds very smoothly when the passage of the die is gradually broadened toward the spinneret, or has a broadened portion on its way to the spinneret, that is, when the polymer can be softened and compressed easily within the passage.

The polymer which has arrived at the spinneret 5 provided at the other end of the die passage receives from the partitioning members sufficient heat (Joule heat) for cutting by the partitioning members whereby it is plasticized and cut. The spinneret 5 is connected to a power supply (not shown) at 100 V to 200 V for example, and the amount of the electric current drom the power supply is controlled by a transformer and a variable resistor (not shown). The polymer is rapidly plasticized at those parts which have made contact with the partitioning members defining the small openings of the spinneret, and then extruded. The cut fine streams of the polymer are then taken up. The take-up is carried out forcibly at a rate larger than the extrusion rate of the polymer. A pair of rotating rollers 6 shown in FIG. 5 are sufficient for effecting this take-up.

The take-up is carried out such that the apparent draft represented by the following equation is at least 1, preferably at least 10.

$$D_a = \frac{v_R \times S_o}{V_o}$$

wherein $v_R$ is the take-up speed in cm/min., $S_o$ is the area in $cm^2$ of the forming zone of the spinneret, and $V_o$ is the true volume in $cm^3$/min. of the shaped mass to be converted to fibers per minute when it is calculated for a packing ratio of 100%.

As shown in FIG. 5, the vicinity of the extruding surface of the spinneret 5 can be cooled by means 7 in the process of this invention. When the polymer is a polymer having a low melting point and a low intrinsic viscosity, for example a melting point of not more than 270° C. and an intrinsic viscosity of not more than 1, cooling the vicinity of the extruding surface of the spinneret is very effective for quickening the solidification of the cut fine streams of the polymer and thus preventing their melt-adhesion after cutting.

It is seen from the above description that according to this invention, the forming system is simplified by processing the starting fiber-forming polymer into a shaped mass of a definite shape and assigning the role of "plunger" to the shaped mass. The plunger-like role of this shaped mass is assigned by the stuffing means such as a pair of rollers. Hence, at least in the initial stage of being stuffed into the die, the shaped mass itself should have such a compression resistance and shape which enable it to be stuffed, as in the case of a rigid plunger.

In the present invention, the force required to extrude the shaped mass from the spinneret, i.e. the stuffing force ($F_p$) is equal to the back pressure ($F_5$) plus the sum ($F_4$) of the internal frictional resistance of the shaped mass and its external friction resistance with respect to the wall of the die passage during the softening and compression of the shaped mass. Accordingly, the shaped mass should at least have such pressure resistance as to withstand the stuffing force ($F_5+F_4$), and the stuffing means should have the ability to generate a stuffing force sufficiently higher than $F_5+F_4$.

Detailed investigations of the present inventors have shown that the back pressure $F_5$ of the spinneret depends upon the type of the spinneret, the amount of electric current, the type of the polymer the rate of extrusion, etc., and the frictional resistance $F_4$ is dominated substantially by the external frictional resistance which depends upon the length of the die passage, variations in its thickness, the temperature of the die, the material of which the wall of the passage is made, the type of the polymer, etc., and is not substantially dominated by the internal frictional resistance attributed to the deformation of the shaped mass. To practice the present invention while maintaining the stuffing force $F_p$ at a minimum value is ideal in saving energy and broadening the range of applicability of the shaped mass. For this purpose, it is most effective to provide a broadened zone in the passage of the die as shown in FIG. 5. Preferably, the coefficient of friction of the passage wall should be minimized by coating it with a fluorocarbon resin or ceramics or applying a satin-finished plating. Furthermore, when the shaped mass is to be pre-heated, the shaped mass and the passage of the die should be prevented from becoming tacky by avoiding an abrupt rise in temperature.

If no measure is taken to reduce the frictional resistance $F_4$, it may sometimes reach 5 to 10 times as high as the back pressure of the spinneret ($F_4=5F_5-10F_5$). But if an effective measure is taken, $F_4$ can be reduced to less than 1/10 or less of $F_5$ $$\left(F_4 < \frac{F_5}{10}\right),$$

and it is also possible to make $F_4$ substantially equal to $F_5$ ($F_4 \approx F_5$). As a result of measuring the back pressure $F_5$ of the spinneret under various conditions, it has been found that $F_5$ is about 1 to 20 kg/cm² (1 kg/cm²<$F_5$<20 kg/cm²). Accordingly, the shaped mass should have a compression resistance of preferably at least 1 kg/cm², preferably up to 20 kg/cm². When the pair of rollers shown in FIG. 5 are used as stuffing means for giving a stuffing force $F_p$ to the shaped mass, the holding pressure ($F_1$) of the rollers should be made not more than the compression strength of the shaped mass. The maximum stuffing force $F_3$ of a pair of rollers is limited by the coefficient of friction between the rollers and the shaped mass and the holding pressure $F_1$ of the rollers, and satisfies the relation $F_3<2\mu F_1$. In order, therefore, to obtain the stuffing force $F_p$ required for the fiber formation in accordance with this invention by means of multiple sets of a pair of rollers, the number of such sets, $N_R$, should be prescribed at $N_R>F_p/2\mu F_1$. Since the number $N_R$ of such sets of a pair of rollers is desirably as small as possible, the rollers should be made of a material having a high coefficient of friction. Investigations of the present inventors have shown that soft rubber having a hardness of 40° to 70° is preferred as such a material.

Figure 6:
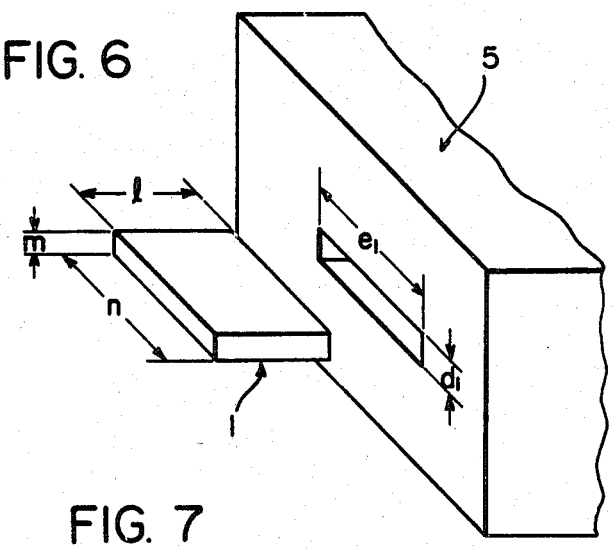
FIG. 6 is a perspective view for illustrating the shape and dimension of the shaped mass used in this invention in relation to the shape and dimension of the inlet of a die passage in the apparatus of this invention.

A preferred shape of the stuffable is a plate-like rectangular parallelpipe as shown at 1 in FIG. 6. Let the inlet dimensions of the passage of the die be $d_1$ and $e_1$ as shown in the drawing and the dimensions of the shaped mass be m and n as shown in FIG. 6, the plate-like rectangular parallelpipe should evidently meet the requirements $m \leq d_1$ and $n \leq e_1$.

Figure 7:
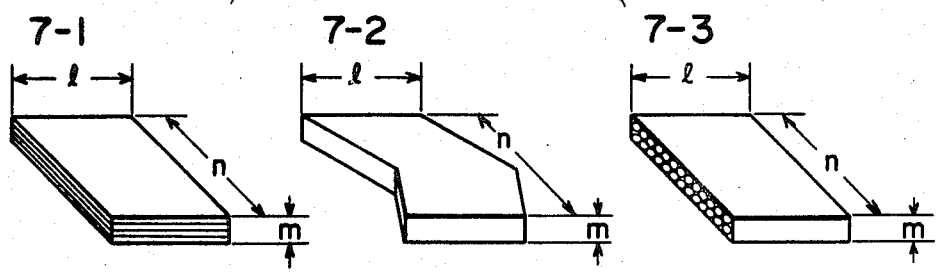
FIG. 7 is a perspective view showing examples of the shape which the shaped mass used in this invention can assume (7-1, 7-2 and 7-3)

The shaped mass may be in various other shapes. For example, it may be in the shape of a rectangular parallelpipe made by stacking films or thin plates such that it conforms to the inlet size of the passage of the die as shown in FIG. 7, 7-1; in the shape of a plate having a depressed portion and a protruding portion combined in the stuffing direction as shown in 7-2 of FIG. 7; or in the shape of a plate-like structure obtained by aligning rods in the stuffing direction as shown in 7-3 of FIG. 7. Needless to say, shaped masses of these shapes should also satisfy the aforesaid relation $m \leq d_1$ and $n \leq e_1$ as described with reference to FIG. 6. There is no particular restriction on the length of the shaped mass in the stuffing direction. As its length becomes larger, the shaped mass is required to have more flexibility against bending. A laminate of films or thin plates such as shown in 7-1 of FIG. 7 is most desirable as the shaped mass having a large length.

As stated hereinabove, the passage of the die in the apparatus of this invention may be substantially linear from its inlet for receiving the shaped mass to the spinneret. Or it can be monotonously broadened, or first broadened and then marrowed from the inlet toward the spinneret starting at the inlet or a point displaced from it. The shape of the passage of the die bears a significant meaning in order that entrained air can be discharged from the shaped mass before the shaped mass reaches the spinneret depending upon the packing ratio of the shaped mass, the properties of the polymer constituting the shaped mass, etc. For example, when a shaped mass having a packing ratio of about 50% obtained by compression molding of a powder of poly(m-phenylene isophthalamide) (PMIA) having an intrinsic viscosity of about 1 is used, a compression pressure of about 2 kg/cm$^2$ is required to compress it to a packing ratio of about 100% while the temperature of the passage of the die is maintained at not more than 350° C. at which heat decomposition of PMIA is unlikely. In order to transmit this compression pressure efficiently to the polymer existing in the vicinity of the spinneret through the shaped mass existing outside the die, it is preferred that the passage of the die is broadened monotonously from its inlet for receiving the shaped mass toward the spinneret starting at the beginning of the passage or at some point displaced from it. Such a passage is composed of, for example, a first parallel zone ($C_1$), a second gently broadened zone ($C_2$) and a third gently and further broadened zone ($C_3$), as illustrated in FIG. 5. In order to assign the role of a rigid plunger to the shaped mass of PMIA having a packing ratio of less than 100%, the shaped mass is heated in the first zone to a temperature lower than the glass transition point (about 260° C.) of PMIA, for example about 250° C., and in the second zone, heated to the temperature at which PMIA begins to be softened (about 300° C.) to aid in compression and accelerate removal of gases. In the third zone, the shaped mass is heated to a temperature at which PMIA beings to be decomposed (about 350° C.) to compress it fully and remove the gases.

On the other hand, when a shaped mass of a melt moldable polymer such as polyethylene terephthalate having an inherent viscosity of not more than 1 is used, the back pressure $F_5$ of the spinneret is frequently lower than the softening and compressing force required to expel air from the shaped mass within the passage of the die. In such a case, the back pressure $F_5$ of the spinneret is increased preferably by using a die having a passage which is broadened and then narrowed. Such a passage is composed of, for example, a first parallel zone ($C_1$), a second broadened zone ($C_2$) and a third narrowed zone ($C_3$), as illustrated in FIG. 8.

The shaped mass (polymer) in the passage of the die is heated preferably such that the heating temperature becomes higher as the shaped mass approaches the spinneret, as stated hereinabove.

The process of this invention can be practiced whether the normal vector of the discharging surface of the spinneret is in the direction of gravity, or in a direction opposite to the gravity direction, or in a direction at right angles to the direction of gravity (i.e., in the horizontal direction). In other words, in whatever direction the discharging surface of the spinneret faces, it is possible to extrude a polymer from the discharging surface of the spinneret and take up the resulting fibrous assembly.

It should be understood therefore that the die used in this invention may include those positioned as stated above in addition to the dies shown in FIGS. 5 and 8 in which they are positioned in a direction at right angles to the gravity direction (i.e., in the horizontal direction). When the die is positioned in the horizontal direction as in FIGS. 5 and 8, it is possible to stuff the shaped mass horizontally into the die and take up the fibrous assembly extruded from the spinneret in the same direction. This brings about the advantage that the supply of the shaped mass into the die and the supplying of the taken-up fibrous assembly to the subsequent step can be carried out industrially beneficially.

As described hereinabove, the present invention provides a very advantageous industrial process in which the shaped mass of fiber-forming polymer in the passage of a die is maintained not in the molten state but in a state called "leather-like or rubbery state" in the field of rheology which is at a temperature intermediate the melting point and the glass transition point, and instantaneously plasticized in the vicinity of the spinneret and thus molded into a fibrous assembly. This process also exhibits its unique characteristics in producing composite fibers from dissimilar polymers or an assembly of composite fibers from a polymer and an additive. Since according to this invention, the state of mixing of dissimilar substances in the shaped mass is directly reflected on the resulting fibers, there can be easily produced composite fibers which have hitherto been difficult to produce because of, for example, the reaction between dissimilar polymers.

For example, when a shaped mass consisting of a laminate of films of dissimilar polymers is used, it can be easily formed into composite fibers having a striped pattern in their cross section. A shaped mass composed of a mixture of a powdery polymer and a powdery inorganic material can be formed into mixed fibers containing a high proportion of the inorganic powder without any trouble (for example, one attributed to reaction) during melt flowing.

According to another aspect, by applying the process of this invention to an aromatic polyamide, there can be provided a novel ultrathick aromatic polyamide fiber having an average cross-sectional area of about 0.01 mm$^2$ to about 5 mm$^2$ and comprising at least one fiber-forming aromatic polyamide and an inorganic or metallic fine powder or a fibrous material.

It has been the previous practice to convert an aromatic polyamide into fibers by preparing a spinning dope of the aromatic polyamide in a solvent and wet-spinning this dope. Accordingly, known fibers composed of an aromatic polyamide fibers alone have a size of about 10 denier at the largest.

Ultrathick aromatic polyamide fibers comprising an inorganic or metallic fine powder or a fibrous material and having an average cross-sectional area of about 0.01 mm$^2$ to about 5 mm$^2$ have been quite unknown in the past, and in fact cannot be produced by any conventional wet-spinning method.

Fiber-forming aromatic polyamides capable of forming the ultrathick aromatic polyamide fibers of this invention are as already described hereinabove.

The fiber-forming aromatic polyamide preferably contains at least 50 mole%, more preferably at least 70 mole%, of at least one kind of recurring units selected from units derived from aromatic dicarboxylic acids, units derived from aromatic diamines and units derived from aromatic aminocarboxylic acids. More preferably, the fiber-forming aromatic polyamide consists substantially of units derived from an aromatic dicarboxylic acid and units derived from an aromatic diamine. Especially preferably, it is poly(m-phenylene isophthalamide).

The ultrathick aromatic polyamide fibers of this invention may contain about 1 to about 100% by volume, preferably about 2 to about 50% by volume, based on the aromatic polyamide, of an inorganic or metallic fine powder or a fibrous material.

The "% by volume" can be calculated from the true volume of the aromatic polyamide (the quotient of its weight divided by its true density) and the true volume of the inorganic or metallic fine powder or the fibrous material (the quotient of its weight divided by its true density).

Examples of the inorganic or metallic fine powder or the fibrous material included in the ultrathick aromatic polyamide fibers of this invention include calcium carbide, titanium oxide, kaolin, clay, talc, diatomaceous earth, potassium titanate, feldspar, mica, glass powder, glass fibers, graphite fibers, carbon black, molybdenum disulfide, meltal powders (for example, powders of copper, aluminum, iron, chromium, and nickel), $\gamma$-$Fe_2O_3$, silicon carbide, alumina, zeolite, and ceramic materials for sintering.

Needless to say, the fine powder or the fibrous material is properly selected according to the end use of the resulting ultrathick aromatic polyamide fibers. For example, when the final aromatic polyamide fibers are to be used in polishing brushes, a material having a high hardness, such as silicon carbide or fused alumina, is preferably used.

The fine powder used in this invention preferably has a particle size of at least 20 Tyler mesh under, more preferably 500 Tyler mesh under. The smallest particle diameter of the fine powder is usually such that the powder passes through a 50,000 Tyler mesh.

The fibrous material preferably has an aspect ratio of at least about 5. It has a minimum cross-sectional area of 1 $mm^2$ to $2.5 \times 10^{-7}$ $mm^2$, preferably $2.5 \times 10^{-3}$ $mm^2$ to $2.5 \times 10^{-7}$ $mm^2$. Its length is usually 5 mm to 0.0005 mm, preferably 0.25 mm to 0.0005 mm.

The inorganic or metallic fine powder or the fibrous material is included preferably in an amount of about 1 to about 100% by volume based on the aromatic polyamide. If its amount is too small, there is no effect of adding such a material. On the other hand, if the amount is too large, the formability of the resulting mixture is reduced. Moreover, the ability of the aromatic polyamide to hold such an additive is decreased so that the additive drops off or the resulting aromatic polyamide fibers are liable to break. In order to increase adhesion between the aromatic polyamide and the additive, it is possible to treat the additive with a coupling agent, etc. before use.

The ultrathick aromatic polyamide fibers produced by applying the process of this invention usually have a non-circular shape in its section taken at right angles to the fiber axis. The other various morphological properties of these fibers can be the same as those of the fibers disclosed, for example, in our copending U.S. patent application Ser. No. 293,269 filed Aug. 17, 1981 and European patent application No. 81303726.4 filed Aug. 14, 1981.

The ultrathick aromatic polyamide fibers of this invention containing the inorganic or metallic fine powder or the fibrous material can be used in various applications by utilizing their excellent mechanical properties attributed to their ultralarge diameters.

In particular, the present invention provides a brush composed of the ultrathick aromatic polyamide fibers.

The length of the ultrathick aromatic polyamide fibers in the brush provided by this invention (the length of the bristles of the brush; to be referred to simply as the "hair length" hereinafter) can, for example, be 1 to 30 cm, preferably 2 to 20 cm, more preferably 3 to 10 cm. Generally, larger hair lengths are preferred for larger cross-sectional areas of the fibers, and shorter hair lengths are preferred for smaller cross-sectional areas. The shorter the hair length, the higher are the flexural resistance, repulsion and elasticity of the brush and the greater the brushing efficiency. If, however, the hair length is too short, the base of the brush may undesirably rub an object to be cleaned when the brushing pressure is too high. On the other hand, when the hair length is too large, the cleaning effect of the brush is reduced, and its service life is shortened. However, when the hair length is large, the brush can be regenerated by trimming the bristles, and the frequency of exchanging the brush can be reduced.

The ultrathick aromatic polyamide fibers forming the brush of this invention have excellent flexural resistance, and repulsive property, and give a brush having a good brushing efficiency even when its hair length is considerably large.

The brush of this invention has an $S_1/S_o$ ratio (packing ratio) of preferably from 0.15 to less than 1.0 ($0.15 \leq S_1/S_o < 1.0$), more preferably from 0.3 to 0.95 ($0.3 \leq S_1/S_o \leq 0.95$). In the above expression, $S_o$ is the area of that zone of the brush into which the fibrous bundles are actually fastened, and $S_1$ is the total sum of the cross-sectional areas of the fibers fastened into that part.

Various methods known per se can be used to fasten the fibers into a base plate. For example, there may be used a method which comprises drilling base plate, embedding fiber bundles into the resulting holes and bonding the roots of the fiber bundles, and a method which comprises the roots of fiber bundles with a channel, bending both sides of the channel inwardly, and fixing them firmly.

The fibers can be implanted in the base plate evenly, or in bundle form, or in a striped pattern (parallel or crossed pattern). When the fibers are implanted in bundles or stripes, $S_o$ in the calculation of the aforesaid packing ratio means the area of the roots of such bundles or stripes, and exclude the area of the spaces between the bundles or between the stripes. The brush so constructed can be used as such or secured to a roller, etc.

Brushes used while being secured to a roll may be in the form of a channel, disc, hemi-disc, spring, U-shape, or ring. Brushes used as such may be a standard brush, a torsion brush, a cylindrical brush, an umbrella-shaped brush, a cup brush, or a wheel brush.

The brush of this invention so obtained has excellent heat resistance and an outstanding brushing efficiency, and can be conveniently used in areas where brushes of conventional materials do not prove to be satisfactory, for example for removing scales from a metal surface at high temperatures (cleaning of a draw plate or a draw roller or cleaning of thin iron plates). Furthermore, since the brushing efficiency of the brush of this invention does not easily decrease (namely it has good durability), it can be economically used for a long period of time in general usages of brushes.

The ultrathick aromatic polyamide fibers provided by this invention can also find application in acoustic insulating materials, reinforcing materials, heat dissipating materials, and semi-conducting materials which require heat resistance.

The following Examples illustrate the present invention in greater detail.

The intrinsic viscosity (I.V.) of a polymer in the examples is defined as follows:

$$I.V. = ln\eta_{rel}/0.5$$

wherein $\eta_{rel}$ is the quotient of the viscosity of the polymer measured at 25° C. for its solution having a concentration of 0.5 g/100 ml by a capillary viscometer divided by the viscosity of the solvent determined by using the same viscometer.

All parts and percentages in these examples are by weight.

In the examples, the average particle diameter denotes the diameter of a circle having the same area as the average area (n=30) of two-dimensional projected images of particles which can be determined from an optical or electron microphotograph of the particles.

EXAMPLE 1

A fibrous assembly was formed from a powder of poly(m-phenylene isophthalamide) (to be abbreviated PMIA hereinafter) obtained by polymerizing m-phenylenediamine and isophthaloyl chloride on the interface of tetrahydrofuran and water, by the process and apparatus of this invention.

This PMIA powder was a secondary agglomerated mass of fine particles, and as a result of microscopic observation, was found to have an average particle diameter of about 50 μm.

The PMIA had an intrinsic viscosity (I.V.) of 1.0 when it was determined for its solution in N-methylpyrrolidone in a concentration of 0.5 g/100 ml by a capillary viscometer.

In order to examine the thermal properties of PMIA, it was subjected to differential thermal analysis in nitrogen at a temperature elevating rate of 10° C./min. A temperature at which PMIA began to melt was about 400° C. When PMIA was subjected to thermogravimetric analysis in air at a temperature elevating rate of 10° C./min., a weight loss owing presumably to oxidative decomposition in the main began slowly at about 350° C., and at about 430° C. and higher, its decomposition rapidly took place.

Furthermore, in order to examine the thermal compressing property of PMIA, it was subjected to a compression test at 350° C. using a plunger-type compression tester. It was consequently found that under a pressure of about 2 kg/cm$^2$, the packing ratio of the PMIA powder reached 95 to 100%.

In view of the above results, it was decided to employ a spinning process in which by using an apparatus having the cross-section shown in FIG. 5, the temperature of the inside of the die was gradually increased up to 350° C. at the highest toward the spinneret so as to increase the packing ratio of the shaped mass gradually to about 100% before it reached the spinneret, and the temperature of the spinneret was raised to about 400° C. by Joule heat generated by passing an electric current through the spinneret so as to plasticize and cut the shaped mass instantaneously.

The PMIA powder was compression-formed at 270° C. by the same compression forming machine as illustrated in FIG. 4 to produce a plate-like rectangular shaped mass shown at 1 in FIG. 6 having sizes l, m and n of 12 cm, 0.95 cm and 9.5 cm respectively and a packing ratio of 60%. These shaped mass had a compression pressure resistance of about 50 kg/cm$^2$.

A plain-weave stainless steel wire mesh (20 mesh) was set in the same apparatus as shown in FIG. 5, and the resulting shaped mass was converted into an assembly of PMIA fibers having a total size of 900,000 denier and an average monofilament size of 970 denier under the conditions shown in Table 1.

On an average, each monofilament of the PMIA fiber assembly had a tenacity of 1.2 g/de, an elongation of 30% and a Young modulus of 50 g/de. Although these fibers were undrawn, they had a Young's modulus close to that of a drawn yarn of PMIA obtained by wet-spinning and subsequent drawing. These fibers were found to be very useful as a heat-resistance brush.

TABLE 1

| | Item | Symbol | Unit | |
|---|---|---|---|---|
| Shaped mass | Dimension shown in FIG. 6 | l | cm | 12.0 |
| | | m | " | 0.95 |
| | | m | " | 9.5 |
| | Packing ratio | ε | % | 60 |
| Stuffing means | Number of sets of a pair of rollers | $N_R$ | set | 3 |
| | Speed of a pair of rollers | $V_R$ | cm/min | 7.5 |
| Die | Number of zones | Nz | | 3 |
| | Length of the passage at the parts shown in FIG. 5 | $C_1$ | cm | 30 |
| | | $C_2$ | " | 20 |
| | | $C_3$ | " | 10 |
| | Thickness of the passage at the parts shown in FIG. 5 | $d_1$ | cm | 1.0 |
| | | $d_2$ | " | 1.2 |
| | | $d_3$ | " | 1.5 |
| | Width of the passage in FIG. 6 | $e_1 = e_2 = e_3$ | cm | 10 |
| | Temperature of the die at the parts shown in FIG. 5 | $H_1$ | °C. | 250 |
| | | $H_2$ | " | 300 |
| | | $H_3$ | " | 350 |
| Spinneret | Opening ratio | α | % | 76 |
| | Number of small openings | No | /cm$^2$ | 62 |
| | Area of the molding zone | $d_3 \times e_3$ | cm × cm | 2 × 10 |
| | Amount of electric current passed | Wc | W/cm$^2$ | 4 |
| | Amount of extrusion | Wp | g/min | 60 |
| | Apparent speed of extrusion | Va | cm/min | 3 |
| Cooling means | Amount of air from 7 in FIG. 5 | Wa | Nm$^3$/min | 0 |
| Take-up means | Speed of take-up rollers | $V_L$ | cm/min | 60 |
| | Apparent draft | Da | | 20 |

EXAMPLE 2

The same PMIA as used in Example 1 and alumina particles (with an average particle diameter of 10 μm) were mixed in a ball mill in a weight ratio of 8:2 to prepare a mixed powder of PMIA and Al$_2$O$_3$. When this powder was observed under a microscope, it was found that the secondary agglomerated mass of PMIA having an average particle diameter of 50 μm were converted to fine particles having an average particle diameter of 10 μm, and the mixing of PMIA and the alumina was very good.

The PMIA/Al$_2$O$_3$ mixed powder was compression-formed at 270° C. to produce many shaped masses having a packing ratio of 65% and a compression pressure resistance of 30 kg/cm$^2$.

A plain-weave stainless steel wire mesh (15 mesh) was set as a spinneret in the same apparatus as in FIG. 5, and heavy-denier fibrous assemblies each having a total size of 1,890,000 denier and a monofilament size of 3600 denier (cross-sectional area about 0.2 mm$^2$) were produced from the shaped masses under the conditions shown in Table 2. The resulting fibrous assemblies were suitable as a material for polishing brushes.

Examination of the surface of the resulting fibers by a scanning electron microscope showed that $Al_2O_3$ existed as protrusions on the surface as shown in FIG. 9, and therefore, the fibers assumed an ideal structure for use as polishing brushes.

The results of testing these fibers in actual use showed that these fibers are a new and useful material for heat-resistant brushes having both the excellent heat resistance of PMIA and the high polishing property of alumina.

TABLE 2

| | Item | Symbol | Unit | |
|---|---|---|---|---|
| Shaped mass | Dimension shown in FIG. 6 | l | cm | 12.0 |
| | | m | " | 0.95 |
| | | n | " | 9.5 |
| | Packing ratio | ε | % | 65 |
| Stuffing means | Number of sets of a pair of rollers | $N_R$ | set | 4 |
| | Speed of a pair of rollers | $V_R$ | cm/min | 6.9 |
| Die | Number of zones | $N_z$ | | 3 |
| | Length of the passage at the parts shown in FIG. 5 | $C_1$ | cm | 300 |
| | | $C_2$ | " | 200 |
| | | $C_3$ | " | 100 |
| | Thickness of the passage at the parts shown in FIG. 5 | $d_1$ | cm | 1.0 |
| | | $d_2$ | " | 1.2 |
| | | $d_3$ | " | 1.5 |
| | Width of the passage in FIG. 6 | $e_1 = e_2 = e_3$ | cm | 10.0 |
| | Temperature of the die at the parts shown in FIG. 5 | $H_1$ | °C. | 250 |
| | | $H_2$ | " | 300 |
| | | $H_3$ | " | 350 |
| Spinneret | Opening ratio | α | % | 76 |
| | Number of small openings | No | /cm² | 35 |
| | Area of the molding zone | $d_3 \times e_3$ | cm × cm | 2.0 × 10.0 |
| | Amount of electric current passed | Wc | W/cm² | 4.5 |
| | Amount of extrusion | Wp | g/min | 63 |
| | Apparent speed of extrusion | Va | cm/min | 3.0 |
| Cooling means | Amount of air from 7 in FIG. 5 | Wa | Nm³/min | 0 |
| Take-up means | Speed of take-up rollers | $V_L$ | cm/min | 36 |
| | Apparent draft | Da | | 12 |

EXAMPLE 3

Nine rolls of polyethylene terephthalate (PET) films having a thickness of 1 mm and a width of 9.5 cm were provided. The nine films were unwound respectively from these rolls and laminated to form a shaped mass having a thickness m of 0.95 cm, a width n of 9.5 cm and a length l of 100 m. A plain-weave stainless steel wire mesh (30 mesh) was set in the same apparatus as shown in FIG. 5, and an attempt was made to produce an undrawn tow having a total size of 60,000 denier and a monofilament size of 43 denier from the resulting shaped mass.

The details of the manufacturing conditions are shown in Table 3. In prescribing the manufacturing conditions, particular attention was paid to the fact that PET had an intrinsic viscosity, measured at 35° C. in o-chlorophenol, of 0.65, a melting point of 265° C. and a water content of 0.3%. Steam generated in the pre-heating stage was removed by sucking from the broadened zone $Z_2$.

The production of a PET fiber assembly under these conditions was very stable in spite of the fact that the starting PET undesirably had a water content of 0.3%. The resulting fibers had an intrinsic viscosity of 0.62 showing little decrease from the initial intrinsic viscosity before spinning. The resulting fibers had a tenacity of 0.8 g/de and an elongation of 400%.

TABLE 3

| | Item | Symbol | Unit | |
|---|---|---|---|---|
| Shaped mass | Dimension shown in FIG. 6 | l | cm | 10000 |
| | | m | " | 0.90 |
| | | n | " | 9.5 |
| | Packing ratio | ε | % | 100 |
| Stuffing means | Number of sets of a pair of rollers | $N_R$ | set | 2 |
| | Speed of a pair of rollers | $V_R$ | cm/min | 8.5 |
| Die | Number of zones | $N_z$ | | 3 |
| | Length of the passage at the parts shown in FIG. 5 | $C_1$ | cm | 30 |
| | | $C_2$ | " | 20 |
| | | $C_3$ | " | 3 |
| | Thickness of the passage at the parts shown in FIG. 5 | $d_1$ | cm | 1.0 |
| | | $d_2$ | " | 1.5 |
| | | $d_3$ | " | 1.0 |
| | Width of the passage in FIG. 6 | $e_1 = e_2 = e_3$ | cm | 10.0 |
| | Temperature of the die at the parts shown in FIG. 5 | $H_1$ | °C. | 200 |
| | | $H_2$ | " | 250 |
| | | $H_3$ | " | 268 |
| Spinneret | Opening ratio | α | % | 72 |
| | Number of small openings | No | /cm² | 140 |
| | Area of the molding zone | $d_3 \times e_3$ | cm × cm | 1.0 × 10.0 |
| | Amount of electric current passed | Wc | W/cm² | 2.5 |
| | Amount of extrusion | Wp | g/min | 100 |
| | Apparent speed of extrusion | Va | cm/min | 7.4 |
| Cooling means | Amount of air from 7 in FIG. 5 | Wa | Nm³/min | 0.3 |
| Take-up means | Speed of take-up rollers | $V_L$ | cm/min | 1500 |
| | Apparent draft | Da | | 200 |

EXAMPLE 4

Thirteen rolls of PET film having a thickness of 0.4 mm and a width of 9.5 cm and 13 rolls of a polybutylene terephthalate (PBT) having a thickness of 0.3 mm and a width of 9.5 cm were provided. The films were unwound respectively from these rolls and laminated alternately to form a continuous shaped mass. An attempt was made to produce an assembly of PET/PBT composite fibers by the same apparatus as shown in FIG. 5 in which a plain-weave stainless steel wire mesh (40 mesh) was set.

The details of the manufacturing conditions are shown in Table 4. In prescribing these conditions, particular attention was paid to the fact that PET had an intrinsic viscosity of 0.55 and a melting point of 265° C., and PBT had an intrinsic viscosity of 1.1 and a melting point of 223° C., and both of these polymers had a water content of about 3%. Steam generated in the pre-heating stage was removed by suction from the broadened zone $Z_2$.

The as-spun fibrous assembly was directly drawn to 3.5 times on a hot plate at 130° C. to give a drawn fibrous assembly having a total size of 12,000 denier and a monofilament size of 4.1 denier. The resulting fibers had a tenacity of 3.2 g/de and an elongation of 30% and exhibited good crimps (the number of crimps 20 per inch).

TABLE 4

| | Item | Symbol | Unit | |
|---|---|---|---|---|
| Shaped mass | Dimension shown in FIG. 6 | l | cm | 50000 |
| | | m | " | 0.9 |
| | | n | " | 9.5 |
| | Packing ratio | ε | % | 100 |
| Stuffing means | Number of sets of a pair of rollers | $N_R$ | | 2 |
| | Speed of a pair of rollers | $V_R$ | cm/min | 8.5 |
| Die | Number of zones | $N_z$ | set | 3 |
| | Length of the passage at the parts shown in FIG. 5 | $C_1$ | cm | 30 |
| | | $C_2$ | " | 20 |
| | | $C_3$ | " | 3 |
| | Thickness of the passage at the parts shown in FIG. 5 | $d_1$ | cm | 1.0 |
| | | $d_2$ | " | 1.2 |
| | | $d_3$ | " | 1.2 |
| | Width of the passage in FIG. 6 | $e_1 = e_2 = e_3$ | cm | 10 |
| | Temperature of the die at the parts shown in FIG. 5 | $H_1$ | °C. | 200 |
| | | $H_2$ | " | 240 |
| | | $H_3$ | " | 260 |
| Spinneret | Opening ratio | α | % | 69 |
| | Number of small openings | No | /cm² | 248 |
| | Area of the molding zone | $d_3 \times e_3$ | cm × cm | 1.2 × 10 |
| | Amount of electric current passed | Wc | W/cm² | 2.8 |
| | Amount of extrusion | Wp | g/min | 60 |
| | Apparent speed of extrusion | Va | cm/min | 3.2 |
| Cooling means | Amount of air from 7 in FIG. 5 | Wa | Nm³/min | 0.4 |
| Take-up means | Speed of take-up rollers | $V_L$ | cm/min | 1280 |
| | Apparent draft | Da | | 400 |

EXAMPLE 5

A powder of superhigh-molecular-weight polyethylene (HESTALEN GUR 412, a tradename for a product of Hoechst AG) was compression-molded at 130° C. by a compression-molding machine of the type shown in FIG. 4 to prepare many rectangular flat plates each having sizes l, m and n shown in FIG. 6 of 12 cm, 0.95 cm, and 9.5 cm respectively, a packing ratio (ε) of 50% and a pressure resistance of about 40 kg/cm².

A stainless steel lattic mesh having a thickness of 2 mm, as shown in FIG. 3, was set as a spinneret in the same apparatus as shown in FIG. 5, and the resulting shaped mass were each formed into a fibrous assembly having a total size of 270,000 denier and a monofilament size of 193 denier under the manufacturing conditions shown in Table 5.

The as-spun fibers were drawn to 13 times in an air bath at 110° C. to give high-tenacity yarns having a total size of 131,000 denier, a monofilament size of 15 denier, a tenacity of 9.5 g/de and an elongation of 6.2%.

TABLE 5

| | Item | Symbol | Unit | |
|---|---|---|---|---|
| Shaped mass | Dimension shown in FIG. 6 | l | cm | 12 |
| | | m | " | 0.95 |
| | | n | " | 9.5 |
| | Packing ratio | ε | % | 50 |
| Stuffing means | Number of sets of a pair of rollers | $N_R$ | | 3 |
| | Speed of a pair of rollers | $V_R$ | cm/min | 12 |
| Die | Number of zones | $N_z$ | | 3 |
| | Length of the passage at the parts shown in FIG. 5 | $C_1$ | cm | 30 |
| | | $C_2$ | " | 20 |
| | | $C_3$ | " | 10 |
| | Thickness of the passage at the parts shown in FIG. 5 | $d_1$ | cm | 1.0 |
| | | $d_2$ | " | 1.4 |
| | | $d_3$ | " | 1.4 |
| | Width of the passage in FIG. 6 | $e_1 = e_2 = e_3$ | cm | 10 |
| | Temperature of the die at the parts shown in FIG. 5 | $H_1$ | °C. | 120 |
| | | $H_2$ | " | 135 |
| | | $H_3$ | " | 140 |
| Spinneret | Opening ratio | α | % | 69 |
| | Number of small openings | No | /cm² | 100 |
| | Area of the molding zone | $d_3 \times e_3$ | cm × cm | 1.4 × 10 |
| | Amount of electric current passed | Wc | W/cm² | 2.2 |
| | Amount of extrusion | Wp | g/min | 60 |
| | Apparent speed of extrusion | Va | cm/min | 4.0 |
| Cooling means | Amount of air from 7 in FIG. 5 | Wa | Nm³/min | 0.2 |
| Take-up means | Speed of take-up rollers | $V_L$ | cm/min | 200 |
| | Apparent draft | Da | | 50 |

EXAMPLE 6

A powder of a wholly aromatic polyester having melt anisotropy and an intrinsic viscosity, determined in o-chlorophenol at 35° C., of 6.0, which was obtained by polymerizing 50 parts of hydroquinone having the benzene ring substituted by an amyl group, 50 parts of terephthalic acid and 50 parts of p-hydroxybenzoic acid, was compression-formed at 260° C. to prepare many rectangular flat plates having sizes l, m and n shown in FIG. 6 of 12 cm, 0.95 cm and 9.5 cm, respectively.

An etched stainless steel plate as shown in FIG. 2 was set as a spinneret in the same apparatus as shown in FIG. 5, and each of these shaped mass was converted into a fibrous assembly having a total size of 730,000 denier and a monofilament size of 203 denier under the manufacturing conditions shown in Table 6.

The resulting fibers underwent orientation and crystallization during the course of forming, and had a tenacity of 8 g/de, an elongation of 3.5%, and a Young's modulus of 380 g/de.

TABLE 6

| | Item | Symbol | Unit | |
|---|---|---|---|---|
| Shaped mass | Dimension shown in FIG. 6 | l | cm | 12 |
| | | m | " | 0.95 |
| | | n | " | 9.5 |
| | Packing ratio | ε | % | 62 |
| Stuffing means | Number of sets of a pair of rollers | $N_R$ | | 3 |
| | Speed of a pair of rollers | $V_R$ | cm/min | 9.5 |
| Die | Number of zones | $N_z$ | | 3 |
| | Length of the passage at the parts shown in FIG. 5 | $C_1$ | cm | 30 |
| | | $C_2$ | " | 20 |
| | | $C_3$ | " | 10 |
| | Thickness of the passage at the parts shown in FIG. 5 | $d_1$ | cm | 1.0 |
| | | $d_2$ | " | 1.4 |
| | | $d_3$ | " | 1.8 |
| | Width of the passage in FIG. 6 | $e_1 = e_2 = e_3$ | cm | 10 |
| | Temperature of the die at the parts shown in FIG. 5 | $H_1$ | °C. | 260 |
| | | $H_2$ | " | 270 |
| | | $H_3$ | " | 270 |
| Spinneret | Opening ratio | α | % | 50 |
| | Number of small openings | No | /cm² | 200 |
| | Area of the molding zone | $d_3 \times e_3$ | cm × cm | 1.8 × 10 |
| | Amount of electric current passed | Wc | W/cm² | 3.0 |

TABLE 6-continued

|  | Item | Symbol | Unit |  |
|---|---|---|---|---|
|  | Amount of extrusion | Wp | g/min | 73 |
|  | Apparent speed of extrusion | Va | cm/min | 3.0 |
| Cooling means | Amount of air from 7 in FIG. | Wa | Nm³/min | 0.2 |
| Take-up means | Speed of take-up rollers | $V_L$ | cm/min | 90 |
|  | Apparent draft | Da |  | 30 |

EXAMPLE 7

A dry powder of poly(m-phenylene isophthalamide) having an intrinsic viscosity (I.V.) in N-methylpyrrolidone of 1.0 in the form of secondary agglomerated particles having an average particle diameter of 35 μm resulting from the agglomeration of particles having an average particle diameter of 0.5 μm was mixed with a powder of alumina having an average particle diameter of 50 μm in a weight ratio of 1:1. The mixture was compression-molded at 270° C. to prepare many plate-like shaped mass (9.5 mm × 95 mm × 120 mm) having a packing ratio of 65%.

Each of the shaped masses was formed into a fibrous assembly useful as a material for polishing brushes by the same apparatus as used in Example 2 in the same way as in Example 2.

The monofilaments constituting the fibrous assembly had an average cross-sectional area of about 0.5 mm².

Monofilaments were selected from the fibrous assembly obtained as above. Each selected monofilament was held at its part 5 cm away from its one end so that the 5 cm portion was kept horizontal. When a load of 53.5 mg was exerted on that end of the filament, there was a change of 0.3 cm in the position of the filament end as an average value of three samples. When the load was removed, all the monofilaments tested returned to the original position. From this relation between the load and the change in position, the rigidity (EI) of the monofilament was determined to be 7280 dyne-cm². This means that the filament has stiffness (flexural rigidity) and recovery sufficient for use as a material for polishing brushes.

A polishing brush was produced from the resulting fibrous assembly, and its properties were examined. Specifically, the fibrous assembly was cut to a length of 12 cm. The fibers were aligned in a linear density of 480/cm, and the aligned assembly was bent at its central portion. This bent portion was used as a root and held by a channel having a width of 1 cm. (Hence, the packing density was 0.59.) The tips of the bristles were trimmed so that the distance from the channel to the tip of each bristle was adjusted to 5.0 cm.

The resulting brush (10 cm wide) was fixed, and brought into contact with an iron disc (10 cm in radius) at 210° C. rotating at a speed of 500 revolutions/min. and having scales adhering to its surface so that the distance between the channel and the surface of the iron disc was adjusted to 4.9 cm. The scales on the surface of the iron disc could be easily removed. Then, another iron disc of the same type as above having scales adhering to its surface was brushed with the same brush. This operation was repeated 100 times, but there was no reduction in the performance of the brush.

EXAMPLE 8

A powder of poly(m-xylylene isophthalamide) having an intrinsic viscosity (I.V.), measured in N-Methylpyrrolidone, of 0.7 in the form of secondary agglomerated particles having an average particle diameter of 200 μm resulting from the agglomeration of particles having an average particle diameter of 1 μm was mixed with carborundum particles having an average particle diameter of 1 μm in a weight ratio of 1:1. The mixture was compression-molded at 300° C. to prepare many plate-like shaped mass (9.5 mm × 95 mm × 120 mm) having a packing ratio of 70%.

Each of the plate-like formed articles was molded into an assembly of poly(m-xylylene isophthalamide) fibers containing carborundum having a substantially square cross section with one side measuring about 110 μm (therefore having a cross-sectional area of 0.012 mm²) by using the same apparatus as in Example 7 except as noted below. As the spinneret, a plain-weave stainless steel wire mesh (60 mesh; wire diameter 0.21 mm) was used, and an electric current of 5 W/cm² was passed through the wire mesh. Cooling air at a speed of about 0.5 m/sec was blown against the extruding surface of the wire mesh, and the resulting fibrous assembly was taken up at a rate of 2.0 m/min.

The fibrous assembly was heat-treated at 280° C. for 1 hour. The monofilaments had an average tenacity of 1.3 g/de, an elongation of 25% and an initial Young's modulus of 1200 kg/mm². The monofilaments had a CV(F) of 0.15. The fibrous assembly had a CV(A) of 0.16 and an average D/d of 1.4.

The monofilaments had a flexural rigidity, measured in the same way as in Example 7, of 150 dynes-cm².

The resulting fibrous assembly was cut to a length of 6 cm, and the fibers were tied at a position 1 cm from the roots so that the packing density ($S_1/S_o$) became 0.65. The tied bundle was secured to a thick torsion wire to form a brush.

When the brush was left to stand for a long period of time on an iron plate heated to 200° C., it did not at all undergo degeneration. It was suitable therefore for finishing the surface of an iron plate at high temperatures.

EXAMPLE 9

A powder of a copolyamide derived from m-phenylenediamine, isophthaloyl chloride and m-aminobenzoyl chloride (in proportions of 42.5 mole%, 42.5 mole% and 15 mole% respectively; having an intrinsic viscosity measured in N-methylpyrrolidone, of 0.9) in the form of secondary agglomerated particles having an average particle diameter of 100 μm resulting from the agglomeration of particles having an average particle diameter of 0.6 μm was mixed with a powder of iron having an average particle diameter of 40 μm in a weight ratio of 1:2.5. The mixture was compression-formed at 250° C. to prepare plate-like shaped mass (9.5 mm × 95 mm × 120 mm) having a packing ratio of 60%.

Each of the shaped mass was converted to ultrathick fibers having an average cross-sectional area of 4.5 mm² in the same way as in Example 7 in the same apparatus as used in Example 7 except that a mesh spinneret lined with a plain-weave wire mesh (30 mesh) and having a thickness of 3 mm and a minimum area, as viewed from the extruding surface of one hole, of 6.0 mm² was used. An electric current of 13 W/cm² was passed through the mesh spinneret, and a current of 6 W/cm², through the plain-weave wire mesh (30 mesh).

The resulting fibrous assembly was cut to a length of 10 cm, and the fibres were evenly embedded in an uncured epoxy resin plate so that the packing density (S₁/S₀) became 0.3. Then, the epoxy resin was cured to form a brush.

This brush could be used at a temperature of 200° C. When it was used for a long period of time for brushing the inner wall of a tank at a high temperature, no reduction in its performance was noted.

EXAMPLE 10

A powder of the same poly(m-phenylene isophthalamide) was used in Example 7 was mixed with a powder of calcium carbonate having an average particle diameter of 85 μm, a short fiber-like powder of potassium titanate (a product of Otsuka Chemical Co., Ltd.) or glass beads having an average particle diameter of 40 μm so that the content of the inorganic powder became 60%, 40%, or 35% by weight, respectively. The mixture was compression-formed in the same way as in Example 7 to form plate-like shaped masses. The shaped masses were each converted to a fibrous assembly by using the same apparatus and conditions as in Example 7.

There were obtained poly(m-phenylene isophthalamide) fibers having an average cross-sectional area of 0.2 to 0.25 mm and containing the calcium carbonate powder, potassium titanate or glass beads. These fibers had excellent properties as a material for brushes.

What is claimed is:

1. A process for producing a fibrous assembly by extruding at least one fiber-forming polymer through a spinneret having numerous small openings, said process comprising using a die equipped with a spinneret having numerous closely spaced small openings having an opening ratio (α), defined by the following equation, of at least 30%, $$\alpha = \frac{V_a - V_f}{V_a} \times 100 \, (\%)$$

wherein $V_a$ (cm³) is the total apparent volume of the spinneret which is taken within 1 cm² of the porous portion of the spinneret and $V_f$ (cm³) is the total volume of partitioning members defining the small openings which is taken within 1 cm² of the porous portion of the spinneret;

continuously stuffing at least one fiber-forming polymer in the form of a shaped mass into said die, said shaped mass having compression resistance such that at least in the initial stage of its stuffing into the die, it substantially retains its form in resistance to the stuffing pressure, and said shaped mass having such a shape that it measures more in one direction than in another; passing through the spinneret an electric current sufficient to give said fiber-forming polymer Joule heat required for cutting said polymer by partitioning members defining the numerous small openings of the spinneret; and taking up the cut fiber-forming polymer as fine streams.

2. The process of claim 1 wherein the spinneret has an opening ratio (α) of about 40 to about 95%.

3. The process of claim 1 wherein the number of the small openings per cm² of the extrusion surface of the spinneret is at least one.

4. The process of claim 3 wherein the number of the small openings per cm² of the extrusion surface of the spinneret is about 5 to about 1,000.

5. The process of claim 1 wherein the spinneret has a thickness of not more than about 10 mm.

6. The process of claim 1 wherein the amount of electric current passed is about 0.5 to about 5,000 watts per cm² of the spinneret.

7. The process of claim 1 wherein in a passage within the die which leads to the spinneret, the fiber-forming polymer is pre-heated gradually to a higher temperature toward the spinneret.

8. The process of claim 1 wherein the shaped mass of the fiber-forming polymer is a compression-molded mass of the polymer in powder form.

9. The process of claim 8 wherein the compression-molded article has an apparent density which is 0.3 to 0.95 times its true density.

10. The process of claim 1 wherein the shaped mass of the fiber-forming polymer is a melt-molded mass of the polymer.

11. The process of claim 1 wherein the shaped mass is in the shape of a flat plate.

12. The process of claim 1 wherein the shaped mass is in the shape of a rod.

13. The process of claim 1 wherein the shaped mass is a laminate of films.

14. The process of claim 1 wherein the shaped mass contains an additive capable of passing through each of the small openings of the spinneret in addition to said at least one fiber-forming polymer.

15. The process of claim 1 wherein the shaped mass has a compression strength of at least about 1 kg/cm².

16. The process of claim 1 wherein the amount of the fiber-forming polymer extruded is about 0.1 to about 20 g/min. per cm² of the spinneret.

* * * * *